(12) United States Patent
Rössler et al.

(10) Patent No.: US 12,421,126 B2
(45) Date of Patent: Sep. 23, 2025

(54) METHOD FOR THE PRODUCTION OF LITHIUM CARBONATE

(71) Applicant: SEP Salt & Evaporation Plants Ltd., Winterthur (CH)

(72) Inventors: Michael Rössler, Buch am Irchel (CH); Jens-Holger Schmidt, Winterthur (CH)

(73) Assignee: SEP Salt & Evaporation Plants Ltd., Winterthur (CH)

( * ) Notice: Subject to any disclaimer, the term of this patent is extended or adjusted under 35 U.S.C. 154(b) by 819 days.

(21) Appl. No.: 17/688,939

(22) Filed: Mar. 8, 2022

(65) Prior Publication Data
US 2022/0289584 A1 Sep. 15, 2022

(30) Foreign Application Priority Data
Mar. 15, 2021 (DE) .......................... 102021106248.9

(51) Int. Cl.
*C01D 15/08* (2006.01)
(52) U.S. Cl.
CPC .................. *C01D 15/08* (2013.01)
(58) Field of Classification Search
CPC ........ C01D 15/08; C01D 3/06; B01D 9/0018; B01D 9/0045; B01D 9/0059; C01F 11/24; C01F 11/18; C22B 3/22; C22B 26/12; C01B 32/60; C01B 9/02
See application file for complete search history.

(56) References Cited

U.S. PATENT DOCUMENTS

| | | | | |
|---|---|---|---|---|
| 6,048,507 A * | 4/2000 | Amouzegar | .............. | C22B 3/42 |
| | | | | 423/179.5 |
| 6,143,260 A | 11/2000 | Boryta | | |
| 9,988,280 B2 | 6/2018 | Donaldson et al. | | |
| 2018/0044194 A1 | 2/2018 | Yang et al. | | |
| 2019/0276328 A1* | 9/2019 | Lazerson | ................ | C01F 11/32 |

FOREIGN PATENT DOCUMENTS

| | | |
|---|---|---|
| CN | 101538057 A1 | 9/2009 |
| CN | 108275703 B | 7/2018 |
| WO | 2018085915 A1 | 5/2018 |

OTHER PUBLICATIONS

Genck (A Clearer View Of Crystallizers, Chemical Engineering, 2011) (Year: 2011).*

* cited by examiner

*Primary Examiner* — Sally A Merkling
*Assistant Examiner* — Logan Edward Laclair
(74) *Attorney, Agent, or Firm* — Michael Soderman

(57) ABSTRACT

A process for the production of lithium carbonate from an aqueous salt solution at least containing lithium ions, chloride ions and calcium ions; the aqueous salt solution with a lithium content of at least 0.005% by weight and a maximum 0.2% by weight is condensed in a first evaporation step at a temperature between 40° C. and 160° C. until a concentrate I with a water content of ≤70% by weight and >60% by weight is formed. In a second evaporation step, the concentrate I is evaporated at a temperature between 60° C. and 180° C. until a concentrate II with a water content of ≤60% by weight is formed. In a Li concentration step, the lithium content is raised to at least 0.14% by heating the concentrate II to a temperature of at least 60° C. and thus a lithium-rich concentrate III and a residue III are formed.

26 Claims, 1 Drawing Sheet

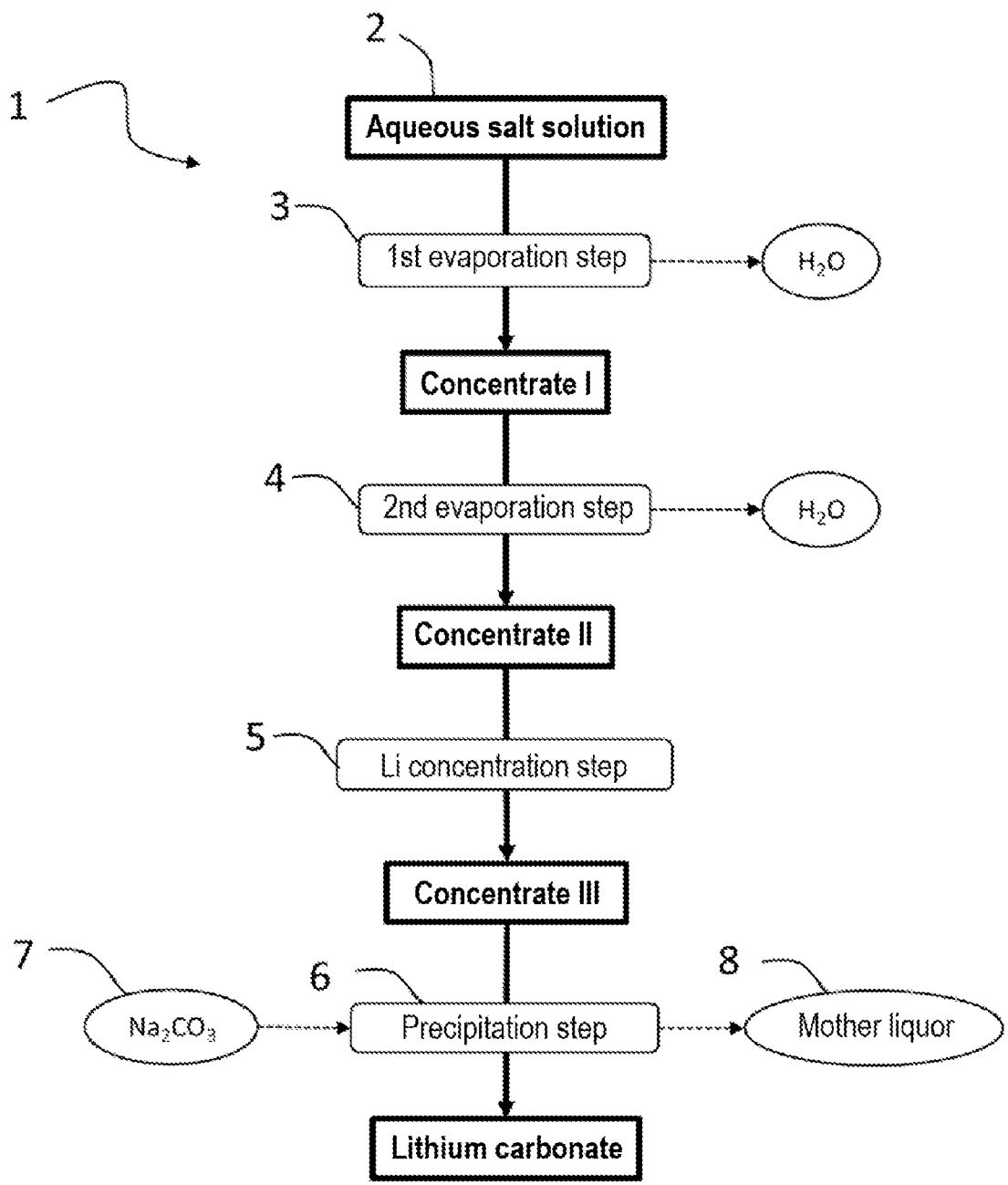

METHOD FOR THE PRODUCTION OF LITHIUM CARBONATE

CROSS REFERENCE TO RELATED APPLICATIONS

This application claims the priority of DE 102021106248.9 filed on 2021-03-15; this application is incorporated by reference herein in its entirety.

BACKGROUND

The invention relates to a process for the production of lithium carbonate from an aqueous salt solution in accordance with the preamble of claim 1.

Processes for the production of lithium carbonate have been known in the art for a long time. Thus, for example, the publication U.S. Pat. No. 6,143,260 discloses a process for the production of lithium carbonate from a magnesium-rich brine. In the context of the disclosed process, the brine is initially condensed, which results in the formation of magnesium-lithium double salts, and then the still-dissolved magnesium is removed by adding calcium oxide and finally, the target product lithium carbonate is obtained by soda ash precipitation and filtration. A comparable process is disclosed in the publications WO 2018/085915 A1 and US 2019/0276328 A1, wherein in addition to the aforementioned steps, following calcium oxide addition, the solution is condensed once again and then a portion of the calcium is removed as calcium sulphate by adding sodium sulphate. Compared with the aforementioned process, that disclosed process has the additional advantage that in addition to the target product of lithium carbonate, sodium chloride and calcium chloride can be obtained as by-products. A similar process is disclosed in patent document U.S. Pat. No. 9,988,280 B2. The disadvantage with that process is that calcium oxide or comparable additives are used in order to purify the brine and then have to be removed again; this can sometimes be expensive.

The publication US 2018/0044194 A1 discloses a process in which lithium carbonate can be obtained from lithium-depleted brines by means of solid-liquid, liquid-solid and liquid-liquid extraction steps. The disadvantage with that process is the use of additional, occasionally organic extraction means. A similar scenario is found in the publications CN 101538057 A1 and CN 108275703 B, which on the one hand provide an additional extraction means and on the other hand, use calcium-free brines.

Thus, the objective of the invention is to provide a process for the production of lithium carbonate which overcomes the disadvantages of the prior art.

SUMMARY

A process (1) is proposed for the production of lithium carbonate from an aqueous salt solution (2) at least containing lithium ions, chloride ions and calcium ions, wherein the aqueous salt solution (2) with a lithium content of at least 0.005% by weight and a maximum of 0.2% by weight is condensed in a first evaporation step (3) at a temperature between 40° C. and 160° C. until a concentrate I with a water content of ≤70% by weight and >60% by weight is formed, in a second evaporation step (4), the concentrate I is evaporated at a temperature between 60° C. and 180° C. until a concentrate II with a water content of ≤60% by weight is formed, in a Li concentration step (5), the lithium content is raised to at least 0.14% by heating the concentrate II to a temperature of at least 60° C. and thus a lithium-rich concentrate III and a residue III are formed, wherein the residue III contains calcium chloride and/or calcium chloride hydrate, and the residue III is separated out, in a precipitation step (6), solid lithium carbonate is formed from the concentrate III by adding carbonates, hydrogen carbonates, carbon dioxide and/or carbon dioxide in combination with a base and the lithium carbonate which is precipitated out or crystallized from the concentrate III by means of carbonate is separated out, whereupon a mother liquor (8) remains, whereupon lithium carbonate is obtained as a solid from a lithium-depleted aqueous salt solution.

DETAILED DESCRIPTION

In fact, the process in accordance with the invention for the production of lithium carbonate with the features of claim 1 has the advantage that lithium carbonate can be obtained as a solid in an efficient manner from a lithium-depleted aqueous salt solution without the addition of extrinsic ions which then have to be removed again in an expensive manner; in the process in accordance with the invention for the production of lithium carbonate from an aqueous salt solution at least containing lithium ions, chloride ions and calcium ions, the aqueous salt solution with a lithium content of at least 0.005% by weight and a maximum of 0.2% by weight is condensed in a first evaporation step at a temperature between 40° C. and 160° C. until a concentrate I with a water content of more than 60% by weight and at most 70% by weight is formed, in a second evaporation step, the concentrate I is condensed at a temperature between 60° C. and 180° C. until a concentrate II with a water content of at most 60% by weight is formed, in a Li concentration step, the lithium content is raised to at least 0.14% by heating the concentrate II to a temperature of at least 60° C. and thus a lithium-rich concentrate III and a residue III are formed, wherein the residue III contains calcium chloride and/or calcium chloride hydrate, and the residue III is separated out, in a precipitation step, solid lithium carbonate is formed from the concentrate III by adding carbonates, hydrogen carbonates, carbon dioxide and/or carbon dioxide in combination with a base, such as sodium hydroxide, for example, and the lithium carbonate which is precipitated out or crystallized from the concentrate III by means of carbonate is separated out, whereupon a mother liquor remains. It is possible for the concentrate II to have a water content of at least 40% by weight, particularly preferably 50% by weight.

In accordance with an advantageous embodiment of the process in accordance with the invention for the production of lithium carbonate, the aqueous salt solution (2) contains at least one further dissolved cationic species, wherein the cationic species belongs to the group formed by alkaline-earth and/or alkali metals.

According to an additional advantageous embodiment of the process in accordance with the invention for the production of lithium carbonate, sodium ions are the at least one further dissolved cationic species.

According to an advantageous embodiment in this regard of the process in accordance with the invention for the production of lithium carbonate, in the first evaporation step, in addition to the concentrate I, solid sodium chloride is formed as the residue I and is then separated from the concentrate I, whereupon a commercially viable by-product is extracted.

According to an additional advantageous embodiment of the process in accordance with the invention for the production of lithium carbonate, in the second evaporation step, in addition to the concentrate II, a solid residue II is formed which contains at least sodium chloride and this is then separated out from the concentrate II.

According to an advantageous embodiment in this regard of the process in accordance with the invention for the production of lithium carbonate, the solid residue II which is separated out from the concentrate II is washed with water, slightly undersaturated sodium chloride solution and/or the mother liquor for a time until only solid sodium chloride remains as the solid; this can also be used for commercial purposes.

According to an advantageous embodiment in this regard of the process in accordance with the invention for the production of lithium carbonate, after washing the residue II, the water, slightly undersaturated sodium chloride solution and/or the mother liquor which are used are collected together as the wash solution I.

According to an additional advantageous embodiment of the process in accordance with the invention for the production of lithium carbonate, magnesium ions, barium ions and/or strontium ions are the at least one further dissolved cationic species.

According to an advantageous embodiment in this regard of the process in accordance with the invention for the production of lithium carbonate, in the second evaporation step, solid barium and/or strontium chloride is/are formed. This means that it would be possible for barium and strontium chloride, inter alia, to be contained in the residue II in addition to sodium chloride.

According to an advantageous embodiment in this regard of the process in accordance with the invention for the production of lithium carbonate, the solid barium and/or strontium chloride which is formed is separated out from the concentrate.

According to an additional advantageous embodiment of the process in accordance with the invention for the production of lithium carbonate, after the second evaporation step, the concentrate II is cooled down to a temperature of $T \leq 40°$ C. in a cooling step. It is also possible for cooling to be carried out to 20° C., whereupon the lithium content rises because of cold crystallization.

According to an advantageous embodiment in this regard of the process in accordance with the invention for the production of lithium carbonate, in the cooling step, a solid residue II-2 is formed and separated from the concentrate II, wherein the solid residue II-2 contains potassium, sodium, barium and/or strontium chloride, strontium chloride hydrate and/or double salts thereof. The formation of strontium chloride hydrate in particular has the additional advantage that in addition, water is removed from the concentrate II in the form of water of crystallization, which means that the concentration of other ions such as calcium, for example, is raised.

According to an advantageous embodiment in this regard of the process in accordance with the invention for the production of lithium carbonate, the residue II-2 is washed with water at 25° C. until only strontium chloride and/or strontium chloride hydrate remains as the solid, whereupon a commercially viable by-product is isolated.

According to an advantageous embodiment in this regard of the process in accordance with the invention for the production of lithium carbonate, after washing the residue II-2, the water used is collected as the wash solution II.

According to an additional advantageous embodiment of the process in accordance with the invention for the production of lithium carbonate, in a $BaCl_2$ concentration step, the barium chloride content in the wash solution I and/or the wash solution II is increased to >20% by weight during a temperature-dependent dewatering, wherein a barium chloride-rich wash water and, in the case in which the wash solution I was used, solid sodium chloride is formed and the solid sodium chloride is separated out.

According to an advantageous embodiment in this regard of the process in accordance with the invention for the production of lithium carbonate, the residue III is washed with water at approximately 30° C. until only calcium chloride hydrate remains as the solid, wherein a calcium chloride-depleted wash water is formed.

According to an advantageous embodiment in this regard of the process in accordance with the invention for the production of lithium carbonate, the calcium chloride-depleted wash water is recycled to the concentrate II, whereupon the other cationic species contained therein are integrated into the overall process once again and no unnecessary losses arise.

According to an additional advantageous embodiment of the process in accordance with the invention for the production of lithium carbonate, after the Li concentration step, a precipitating agent, preferably hydroxide, is added to the concentrate III in a precipitation step. It is also possible to use solid sodium hydroxide, but compared with this, sodium hydroxide has the advantage that injection is easier to carry out. It would also be possible to obtain the sodium hydroxide by means of chloralkali electrolysis of the sodium chloride which has already been separated out; this would further increase procedural economies. It would also be possible to use carbonates instead of hydroxides.

According to an advantageous embodiment in this regard of the process in accordance with the invention for the production of lithium carbonate, by adding the precipitating agent, preferably sodium hydroxide, magnesium, barium, strontium and/or calcium hydroxide is/are formed and then separated out.

According to an additional advantageous embodiment of the process in accordance with the invention for the production of lithium carbonate, in the Li concentration step, the lithium content is raised to the Li saturation threshold by heating the concentrate II to a temperature $T$ of $\geq 60°$ C., whereupon the final yield of lithium carbonate is additionally raised. In addition to heating, it would also be possible for other temperature-dependent methods for dewatering to be used, such as freezing out the water.

According to an additional advantageous embodiment of the process in accordance with the invention for the production of lithium carbonate, the mother liquor, the wash solution I, the wash solution II and/or the barium-rich wash water is recycled to the aqueous salt solution and/or to the concentrate I, which is advantageous as regards procedural economies, and so the overall yield is further increased.

According to an additional advantageous embodiment of the process in accordance with the invention for the production of lithium carbonate, in the precipitation step, lithium sulphate is initially precipitated by adding sodium sulphate, and then lithium sulphate is converted into lithium carbonate with sodium carbonate.

According to an additional advantageous embodiment of, the process in accordance with the invention for the production of lithium carbonate, the lithium carbonate which is formed is dissolved by adding carbon dioxide, the solution which is formed is filtered and lithium carbonate is precipitated out again therefrom by adding hydroxides, whereupon an additional increase in the purity of the lithium carbonate is obtained. In addition to hydroxides, the addition of carbonates would also be possible. It would also be possible to expel the $CO_2$ again by heating, which would also lead to regeneration of the lithium carbonate.

According to an additional advantageous embodiment of the process in accordance with the invention for the production of lithium carbonate, in the aqueous salt solution, organic carbon compounds are present as impurities and these are removed before the second evaporation step by emulsion splitting or other types of elimination, because otherwise, these impurities, which in particular are present in technical aqueous salt solutions, would put an additional strain on the units and could contaminate them. In principle, it is also possible for the organic carbon compounds to be separated out before the first evaporation step. Possible processes for the elimination of the organic compounds are, inter alia, flocculation, absorption or mechanical purification, in addition to a plurality of other processes which are known to the person skilled in the art.

According to an additional advantageous embodiment of the process in accordance with the invention for the production of lithium carbonate, the aqueous salt solution originates from industrial units, in particular from oil and gas production and industries, and/or from natural sources. The aqueous salt solution could contain different proportions of organic solvents, depending on its origin; this would have to be separated out in intermediate process steps.

According to an additional advantageous embodiment of the process in accordance with the invention for the production of lithium carbonate, heavy metal residues are present in the aqueous salt solution which are separated out before the first evaporation step. Otherwise, these heavy metals would occur as by-products at different stages of the process.

According to an additional advantageous embodiment of the process in accordance with the invention for the production of lithium carbonate, the first evaporation step is an evaporator unit with mechanical vapour compression or a multistage evaporation unit which is heated by steam or by other means.

According to an additional advantageous embodiment of the process in accordance with the invention for the production of lithium carbonate, the second evaporation step is a forced circulation crystallizer.

Further advantages and advantageous embodiments of the invention can be found in the description, claims and drawings below.

BRIEF DESCRIPTION OF THE DRAWINGS

A preferred exemplary embodiment of the process in accordance with the invention is shown in the drawing and will be described in more detail below. In the drawing:

FIG. 1 shows a preferred flow chart for the process in accordance with the invention for the production of lithium carbonate from an aqueous salt solution.

DETAILED DESCRIPTION OF THE PREFERRED EMBODIMENTS

FIG. 1 shows a simplified flow chart for the process 1 in accordance with the invention for the production of lithium carbonate from an aqueous salt solution 2.

The 5 steps in the simplified process 1 for the production of lithium carbonate can be summarised as follows:

1. First evaporation step 3: the aqueous salt solution 2 with a Li content of at least 0.005% by weight and at most 0.2% by weight is condensed by heating to between 40° C. and 160° C. to a water content of at most 70% by weight and at least 60% by weight, whereupon a concentrate I is formed.
2. Second evaporation step 4: the concentrate I is condensed further by heating to between 60° C. and 180° C. until the water content is at most 60% by weight, whereupon a concentrate II is formed.
3. Li concentration step 5: the concentrate II is concentrated, by heating to at least 60° C., to a Li content of at least 0.14% by weight, whereupon a concentrate III and a residue III are formed, wherein the residue III contains calcium chloride and/or calcium chloride hydrate, and the residue III is separated.
4. Precipitation step 6: lithium is precipitated as lithium carbonate with a precipitating agent 7, preferably a carbonate or a carbonate-forming agent.
5. Lithium carbonate separation: the solid lithium carbonate is separated from the mother liquor 8.

In addition to lithium and chloride ions, the aqueous salt solutions 2 used in the process 1 in accordance with the invention typically contain other cationic and anionic species which, in the context of the process 1 in accordance with the invention, are removed therefrom at various stages and can be upgraded for commercial use. Aqueous salt solutions 2 of natural origin containing lithium ions, such as brines, also contain other alkali and alkaline-earth cations, which means that it is particularly important to provide a process which enables lithium carbonate to be produced in the presence of these cationic species. This is also the case with aqueous salt solutions of industrial origin containing lithium ions. In the context of the process in accordance with the invention, the cationic species sodium, potassium, calcium, strontium, barium and magnesium can be separated out and partially purified to the extent that they are commercially viable. This fractional crystallization procedure is facilitated by the stepwise evaporation. In particular, in the first evaporation step 3 and the second evaporation step 4, the water content is reduced in a stepwise manner, which in turn has the advantage that any by-products can be deliberately separated out with a high purity. These two steps are evaporation processes, whereas in the Li crystallization step, the water content is preferably reduced by crystallizing hydrates, in particular hydrated salts. In contrast, too rapid or uncontrolled condensation would lead to the formation of mixed residues which, in addition to a mixture of different salts, could also contain mixed salts such as double salts.

In the Li concentration step 5, calcium is precipitated out as calcium chloride hydrate and therefore separates out from the concentrate III. Calcium chloride hydrate will crystallize from a lithium chloride content of 1.5% by weight. The formation of calcium chloride hydrate constitutes an opportunity to reduce the water content of the concentrate further, because water molecules are bound as water of hydration or water of crystallization and therefore is removed from the liquid phase. The separated calcium chloride hydrate is washed with water at approximately 30° C., and thus is freed from adhering impurities. The calcium chloride-enriched wash water which results can be recycled to the concentrate II.

Sodium ions are obtained in part as a solid, in the form of sodium chloride, in the first evaporation step 3 and in the second evaporation step 4 and separated out. In the first evaporation step 3 in particular, high purity sodium chloride is obtained as residue I which can be used commercially. The residue II obtained from the second evaporation step 4 can also contain other cationic species in addition to sodium which can be removed from residue II with water, for example, so that only sodium chloride remains as the solid. The wash solution I which is formed here is further condensed at 90° C. in order to crystallize out additional sodium chloride. The wash water which is formed here can be recycled to the concentrate I, but also to the original aqueous salt solution 2.

Strontium ions can be removed from the concentrate II by means of an intermediate cooling step after the second evaporation step 4 by cold crystallization, in which the concentrate II is heated to a temperature of 40° C. and cooled slightly. The crystallized residue II-2 which may contain other extrinsic cations such as potassium, sodium, barium and/or strontium chloride, strontium chloride hydrate and/or double salts of the above in addition to strontium chloride and/or strontium chloride hydrate, is washed with water, preferably at 25° C., whereupon these extrinsic cations are removed. The strontium chloride which is obtained can be used further commercially. The wash solution II which is obtained can be processed further alone or in combination with the wash solution I, as described above, and finally be supplied to the concentrate I or the original aqueous salt solution 2.

Barium ions can separate out in part in the second evaporation step 4. Again, barium chloride in residue II-2 can be partially crystallized in an intermediate cooling step. In both cases, the barium ions in the wash solution I and/or II are concentrated. In a barium chloride concentration step ($BaCl_2$ concentration step), by means of temperature-dependent water removal, the barium chloride content in the wash solution I and/or II is raised to 20% by weight, whereupon any sodium chloride which is present crystallizes out. The barium chloride-rich wash water can be recycled to the concentrate I or to the original aqueous salt solution 2.

Alkaline-earth metal cations can be removed after the Li concentration step 5 by adding carbonates and/or hydroxides to the concentrate III, in which they are precipitated at room temperature as hydroxides. In addition to sodium hydroxide, other precipitating agents which produce a sufficiently basic medium for hydroxide formation and which are known to the person skilled in the art, such as lithium hydroxide or potassium hydroxide, may be used.

The formation of the target product lithium carbonate by adding carbonates and/or a carbonate-forming reagent such as carbon dioxide and the separation of lithium carbonate form the final steps of the process 1 in accordance with the invention, wherein further steps for raising the purity of the lithium carbonate formed may also be envisaged. Thus, it is possible to convert the lithium carbonate formed into lithium hydrogen carbonate by adding carbon dioxide; lithium hydrogen carbonate has a higher solubility product, and so lithium ions go back into solution. This then means that solid impurities can be separated out, for example by filtration, before carbon dioxide is driven off again and lithium carbonate is regenerated.

The aqueous salt solution 2 ought to be freed from heavy metals and organic impurities prior to the first evaporation step 3 because these can deleteriously affect the rest of the process and in particular can damage the units used or make the evaporation processes more difficult or even impossible because of foam formation. Examples of organic impurities in aqueous salt solutions 2 of industrial origin are oils, fats or in fact other emulsion-forming materials. A plurality of methods which are known to the person skilled in the art may be used for purification.

The following examples describe further details of the process 1 in accordance with the invention without limiting it, however.

Example 1

10000 kg of an aqueous salt solution 2 with a composition corresponding to Table 1 was evaporated per hour in an evaporation unit with mechanical vapour compression, in the first evaporation step 3, at 123° C. to a water content of 67.08% by weight. 1.075 kg of sodium chloride crystallized out as residue I in this case and was separated out for further commercial use. The concentrate I which remained in the first evaporation step 3 was then reduced in a forced circulation crystallizer as the second evaporation step 4, at 140° C., to a water content of 51.40% by weight (concentrate II), whereupon a solid residue II was formed which was separated out and processed further. The concentrate II was cooled to 40° C., whereupon a solid residue II-2 was formed which could also be separated out. The cooled solution was then reduced to a LiCl content of 2.5% by weight at 60° C., wherein at the same time, a solid residue III was formed. From the concentrate III which was formed in this manner, any alkaline-earth cations which were still present were separated out by adding sodium hydroxide (20% by weight) and then lithium carbonate was precipitated out by adding soda ash. In the context of the process in accordance with the invention, in this manner, 3 kg of lithium carbonate per hour could be obtained, which corresponded to a yield of 36.03% which could be further increased by recycling the mother liquor.

A further 254 kg of NaCl could be obtained from residue I by washing with water. 42 kg of $SrCl_2$ was obtained as residue II-2 after washing. After washing, 159 kg of calcium chloride hydrate remained in residue III. All of the details relate to the respective yield per hour; the exact compositions of concentrates I-III and of residues I-III can be obtained from Tables 1 and 2.

TABLE 1

Composition of aqueous salt solution, concentrate I-III, as a % by weight.

|  | Aqueous salt solution | Concentrate I | Concentrate II | Concentrate III |
|---|---|---|---|---|
| $CaCl_2$ | 4.00 | 15.49 | 38.60 | 53.00 |
| $BaCl_2$ | 0.43 | 1.67 | 0.50 | 0.10 |
| $MgCl_2$ | 0.09 | 0.36 | 0.50 | 0.10 |
| NaCl | 14.00 | 12.59 | 2.00 | 0.40 |
| $SrCl_2$ | 0.62 | 2.41 | 5.90 | 0.90 |
| LiCl | 0.10 | 0.40 | 1.01 | 2.50 |
| H2O | 80.74 | 67.08 | 51.40 | 42.90 |

TABLE 2

Composition of residues II, II-2 and III, as a % by weight.

|  | Residue II | Residue II-2 | Residue III |
|---|---|---|---|
| $CaCl_2$ | — | — | 55.63 |
| $BaCl_2$ | 10.68 | 5.49 | 0.16 |
| $MgCl_2$ | 1.16 | — | 1.48 |
| NaCl | 85.50 | 23.15 | 0.34 |
| $SrCl_2$ | 0.31 | 57.37 | 4.02 |
| H2O | 2.36 | 13.99 | 38.18 |

Any of the features disclosed herein may make a technical contribution to the invention, both alone as well as in any combinations with each other.

LIST OF REFERENCE NUMERALS 1 process for the production of lithium carbonate
2 aqueous salt solution
3 first evaporation step
4 second evaporation step
5 Li concentration step
6 precipitation step
7 precipitating agent
8 mother liquor

The invention claimed is:

1. A process (1) for the production of lithium carbonate from an aqueous salt solution (2) at least containing lithium ions, strontium ions, chloride ions and calcium ions, characterized in that
   (1) the aqueous salt solution (2) with a lithium content of at least 0.005% by weight and a maximum of 0.2% by weight is condensed in a first evaporation step (3) at a temperature between 40° C. and 160° C. until a concentrate I with a water content of ≤70% by weight and >60% by weight is formed,
   (2) in a second evaporation step (4), the concentrate I is condensed at a temperature between 60° C. and 180°° C. until a concentrate II with a water content of ≤60% by weight is formed,
   (3) after the second evaporation step (4), the concentrate II is cooled down to a temperature of T≤40° C. in a cooling step, and a solid residue II-2 is formed in the cooling step and separated from the concentrate II, wherein the solid residue II-2 contains strontium chloride and/or strontium chloride hydrate,
   (4) in a Li concentration step (5), the lithium content is raised to at least 0.14% by heating the concentrate II to a temperature of at least 60° C. and thus a lithium-rich concentrate III and a residue III are formed, wherein the residue III contains calcium chloride and/or calcium chloride hydrate, and the residue III is separated out,
   (5) in a precipitation step (6), solid lithium carbonate is formed from the concentrate III by adding carbonates, hydrogen carbonates, carbon dioxide and/or carbon dioxide in combination with a base, and
   (6) the lithium carbonate which is precipitated out or crystallized from the concentrate III by means of carbonate is separated out, whereupon a mother liquor (8) remains.

2. The process (1) for the production of lithium carbonate as claimed in claim 1,
   characterized in that
   the aqueous salt solution (2) contains at least one further dissolved cationic species, wherein the cationic species belongs to the group formed by alkaline-earth and/or alkali metals.

3. The process (1) for the production of lithium carbonate as claimed in claim 2,
   characterized in that
   sodium ions are the at least one further dissolved cationic species.

4. The process (1) for the production of lithium carbonate as claimed in claim 3,
   characterized in that
   in the first evaporation step (3), in addition to the concentrate I, solid sodium chloride is formed as the residue I and is then separated from the concentrate I.

5. The process (1) for the production of lithium carbonate as claimed in claim 3,
   characterized in that
   in the second evaporation step (4), in addition to the concentrate II, a solid residue II is formed which contains at least sodium chloride and this is then separated out from the concentrate II.

6. The process (1) for the production of lithium carbonate as claimed in claim 5,
   characterized in that
   the solid residue II which is separated out from the concentrate II is washed with water, slightly undersaturated sodium chloride solution and/or the mother liquor (8) for a time until only solid sodium chloride remains as the solid.

7. The process (1) for the production of lithium carbonate as claimed in claim 6,
   characterized in that
   after washing the residue II, the water, the slightly undersaturated sodium chloride solution and/or the mother liquor (8) which are used are collected together as the wash solution I.

8. The process (1) for the production of lithium carbonate as claimed in claim 1,
   characterized in that
   in the second evaporation step (4), strontium chloride is formed.

9. The process (1) for the production of lithium carbonate as claimed in claim 8,
   characterized in that
   strontium chloride which is formed is separated out from the concentrate II.

10. The process (1) for the production of lithium carbonate as claimed in claim 1,
    characterized in that
    the solid residue II-2 contains potassium, and/or strontium chloride, strontium chloride hydrate and/or double salts thereof.

11. The process (1) for the production of lithium carbonate as claimed in claim 10,
    characterized in that
    the residue II-2 is washed with water at 25° C. until only strontium chloride and/or strontium chloride hydrate remains as the solid.

12. The process (1) for the production of lithium carbonate as claimed in claim 11,
    characterized in that after washing the residue II-2, the water used is collected as wash solution II.

13. The process (1) for the production of lithium carbonate as claimed in claim 7,
    characterized in that
    in a $BaCl_2$ concentration step, the barium chloride content in the wash solution I and/or the wash solution II is increased to >20% by weight during a temperature-dependent dewatering, wherein a barium chloride-rich wash water and, in the case in which the wash solution I was used, solid sodium chloride is formed and the solid sodium chloride is separated out.

14. The process (1) for the production of lithium carbonate as claimed in claim 13,
    characterized in that
    the residue III is washed with water at approximately 30° C. until only calcium chloride hydrate remains as the solid, wherein a calcium chloride-depleted wash water is formed.

15. The process (1) for the production of lithium carbonate as claimed in claim 14,
    characterized in that
    the calcium chloride-depleted wash water is recycled to the concentrate II.

16. The process (1) for the production of lithium carbonate as claimed in claim 1,
characterized in that
after the Li concentration step (5), a precipitating agent, preferably sodium hydroxide, is added to the concentrate III in a precipitation step.

17. The process (1) for the production of lithium carbonate as claimed in claim 16,
characterized in that
by adding the precipitating agent, preferably sodium hydroxide, magnesium, barium, strontium and/or calcium hydroxide is/are formed and then separated out.

18. The process (1) for the production of lithium carbonate as claimed in claim 1,
characterized in that
in the Li concentration step (5), the lithium content is raised to Li saturation by heating the concentrate II to a temperature T of $\geq 60°$ C.

19. The process (1) for the production of lithium carbonate as claimed in claim 2,
characterized in that
the mother liquor (8), the wash solution I, the wash solution II and/or the barium-rich wash water is recycled to the aqueous salt solution (2) and/or to the concentrate I.

20. The process (1) for the production of lithium carbonate as claimed in claim 1,
characterized in that
in the precipitation step (6), lithium sulphate is initially precipitated by adding sodium sulphate, and then lithium sulphate is converted into lithium carbonate with sodium carbonate.

21. The process (1) for the production of lithium carbonate as claimed in claim 1,
characterized in that
the lithium carbonate which is formed is dissolved by adding carbon dioxide, the solution which is formed is filtered and lithium carbonate is precipitated out again therefrom by adding hydroxides.

22. The process (1) for the production of lithium carbonate as claimed in claim 1,
characterized in that
in the aqueous salt solution (2), organic carbon compounds are present as impurities and these are removed before the second evaporation step (4) by emulsion splitting or other types of elimination.

23. The process (1) for the production of lithium carbonate as claimed in claim 1,
characterized in that
the aqueous salt solution (2) originates from industrial units, in particular from oil and gas production and industries, and/or from natural sources.

24. The process (1) for the production of lithium carbonate as claimed in claim 1,
characterized in that
heavy metal residues are present in the aqueous salt solution (2) which are separated out before the first evaporation step (3).

25. The process (1) for the production of lithium carbonate as claimed in claim 1,
characterized in that
the first evaporation step (3) is performed in an evaporator unit with mechanical vapour compression or a multi-stage evaporation unit which is heated by steam or by other means.

26. The process (1) for the production of lithium carbonate as claimed in claim 1,
characterized in that
the second evaporation step (4) is performed in a forced circulation crystallizer.

* * * * *